United States Patent [19]

Jackson et al.

[11] Patent Number: 4,695,917
[45] Date of Patent: Sep. 22, 1987

[54] INDUCTIVE POWER CONTROLLER

[75] Inventors: Kenneth R. Jackson, Huntington Beach; Farshid Tofigh, Mission Viejo, both of Calif.

[73] Assignee: Leach Corporation, Buena Park, Calif.

[21] Appl. No.: 805,072

[22] Filed: Dec. 4, 1985

[51] Int. Cl.[4] .............................................. H02H 9/08
[52] U.S. Cl. ........................................ 361/58; 361/11; 323/249; 323/262
[58] Field of Search ............... 323/249, 251, 254, 259, 323/261, 262, 263; 361/3, 4, 8, 9, 10, 11, 43, 58, 126

[56] References Cited

U.S. PATENT DOCUMENTS

| | | | |
|---|---|---|---|
| 2,350,195 | 5/1944 | Rypinski | 361/58 |
| 3,403,323 | 9/1968 | Wanlass | 323/250 |
| 3,732,485 | 5/1973 | Kettler | 323/263 |
| 4,163,190 | 7/1979 | Moerman | 361/58 X |
| 4,358,808 | 11/1982 | Praeg | 361/11 |

FOREIGN PATENT DOCUMENTS 630708 10/1978 U.S.S.R. ................... 361/58

*Primary Examiner*—M. H. Paschall
*Assistant Examiner*—H. L. Williams
*Attorney, Agent, or Firm*—Nilsson, Robbins, Dalgarn, Berliner, Carson & Wurst

[57] ABSTRACT

Power to a load is controlled by actuation of an inductive circuit from a first condition of low inductance to a second condition of higher inductance in response to a preselected overcurrent condition. In a first preferred embodiment, the inductive circuit comprises a pair of coils electrically connectible so that magnetic fields produced by current flow in the coils oppose each other in the first condition, reducing the magnetic flux and thus the effective inductance of the circuit. The magnetic fields are either neutral to each other or reinforce each other in the second condition, giving rise to a higher inductance. Alternatively, the inductive circuit may include one or more fixed value inductors interposed between a power supply and a load in response to an overcurrent condition.

25 Claims, 13 Drawing Figures

INDUCTIVE POWER CONTROLLER

BACKGROUND OF THE INVENTION

The present invention relates generally to the field of power control and, more particularly, to an apparatus and a method for limiting alternating current to a load by increasing the inductance of a control circuit.

The invention is particularly useful in the context of remote power controllers and remote-controlled circuit breakers which satisfy the requirements of military specifications MIL-P-81653B, dated Feb. 14, 1980, and MIL-C-83383B, dated Oct. 18, 1983. Controller devices of this type comprise output power switches which represent a low impedance between supply and load terminals in an "ON" state and a higher impedance in an "OFF" state. The state of the power switch normally conforms to that represented by an externally applied command signal. On detection of an electrical overload, the controller opens the circuit to isolate the load circuit from the supply or limits the fault current to a preselected maximum value.

Remote power controllers have application in the field of aerospace, in which it is necessary to prevent damage to aircraft wiring in the event of a load fault or a short circuit in the wiring system. Such controllers perform the combined functions of relays and circuit breakers in single and multiphase systems. They permit the ON/OFF control of electrical loads under normal conditions by signals from remote (pilot-operated) switches or a master control computer and, in the event of a load fault condition, open the circuit to the load. Both the magnitude and duration of the current in the load circuit are considered in determining whether an overcurrent condition exists. For example, a current equal to 600 percent of rated current might be tolerable for approximately 100 milliseconds, to account for the conditions encountered during motor startup, while a current of 140 percent of rated current might be acceptable for as long as several seconds during generator overvoltage surges.

Remote power controllers (RPC's) typically open and close power circuits by solid state switches operated in accordance with master control signals or trip signals based on the magnitude of an overcurrent condition and the time during which it is present. Remote controlled circuit breakers (RCCB's) are similar in design to RPC's but use electromechanical contacts instead of solid state switches. The switches and/or relays must be designed to withstand high short circuit currents before they open in order to prevent damage to the devices and to satisfy military specifications. Short circuit fault currents can be as high as 6000 amps (MIL-P-81653), requiring the devices to be greatly overdesigned for normal steady state conditions. For example, it is not unusual for a transistor or silicon-controlled rectifier (SCR) rated for 35 or 70 amps steady state to be used in an RPC for a circuit having a steady state current rating of only 3 amps.

Another disadvantage of some solid state switches, including SCR's, is that they switch between "ON" and "OFF" conditions only at a zero-current crossing. In a 400 hertz power system, zero-crossings occur every 1.25 milliseconds, whereas a short circuit current maximum can occur in a much shorter time. Thus, permanent damage can be done to a circuit before a conventional RPC acts.

Electromehanical relays of a conventional RCCB's are even slower to act in response to a fault (typically 10 to 30 milliseconds). They also deteriorate rapidly if called upon to open and close under high current conditions.

Therefore, it is desirable in many applications to provide an apparatus and a method for rapid limitation of fault currents.

SUMMARY OF THE INVENTION

The present invention is an apparatus and a method for controlling AC power to a load by: applying a voltage to the load through an inductive circuit controllable between a first condition of low inductance and a second condition of higher inductance; sensing current to the load; and switching the inductive circuit from the first condition to the second condition in response to sensing of a preselected overcurrent to the load.

In a preferred embodiment, the inductive circuit comprises first and second coils energized so that the magnetizing force produced by current flow in the second coil when the circuit is in the first condition of low impedance opposes the magnetizing force produced by current flow in the first coil, reducing to near zero the magnetic flux in the common core. Alternatively, the inductive circuit comprises one or more fixed value inductors connected so that current passes through them to the load in the second condition of high impedance and substantially bypasses them in the first condition of low impedance.

In either embodiment, a change of effective inductance is triggered by switching a control circuit. The triggering switches are not exposed to high currents if they act rapidly because current is limited by the inductance itself. Thus, the triggering switches can have a much lower power rating than the switches of prior art controllers. This drastically reduces the cost and size of the power switching device. Switching of the control circuit is preferably accomplished by solid state switches such as field effect transistors (FET's) or gate turn-off thyristors (GTO's) which act almost instantaneously but are unable to take the power levels required in the prior art. The increased inductance of the control circuit drastically increases the impedance of the controller, thereby limiting current to a safe value until other contacts or switches can be opened to disconnect power completely. The device can also be switched to the condition of high inductance before power is applied, enabling a fault in the load to be detected without subjecting the system to high fault currents.

With a fast-acting current limiter in series with an ON/OFF power switch, the stress on the power switch under fault conditions is greatly reduced from that encountered in prior art devices. Consequently, the rating, size and cost of the power switch can be reduced, whether the switch is solid state or electromechanical in design.

An even more important result of using fast-acting current limiters to prevent massive fault currents occurs in an aerospace/aircraft electrical system because the generators and wires can be much smaller and lighter since they are never exposed to a dead short load condition.

Power control according to the present invention is extremely efficient because of its inductive characteristic. The only power loss associated with the inductor is due to its resistance, which can be minimized by appropriate design of the inductor windings. That is, the impedance of the inductor is the sum of its resistance (R), its inductive reactance ($X_L$) and its capacitive reactance ($X_C$). Ignoring capacitive effects, the impedance can be expressed as $Z=R+jX_L$, with $X_L=\omega.L$. The effect of R is to dissipate energy, while $X_L$ merely blocks current by the nondissipative "choking" effect of an inductor.

In minimizing power consumption, the controller of the invention also minimizes heat dissipation within an aircraft or other system of which the controller is a part. This reduces the size of heat sinks required and is particularly significant in airborne systems in which a large number of controllers are used. Consider a 10 amp circuit in a 120 volt/400 hertz system wherein current is limited resistively to no more than 200 percent of the rated level by a prior art controller having a transistor control element. If the load is a short circuit, the full supply voltage is applied across the transistor and the current rises to its maximum permissible value (20 amps), dissipating up to 2400 watts as heat. In similar circumstances, the inductive control element of the present invention blocks the current without dissipating power, except that due to residual resistance of the element and the normal copper and hysteresis losses in the core.

BRIEF DESCRIPTION OF THE DRAWINGS

The above and other features of the present invention may be more fully understood from the following detailed description, together with the accompanying drawings, wherein similar reference characters refer to similar elements throughout and in which.

DESCRIPTION OF THE PREFERRED EMBODIMENT

Figure 1:
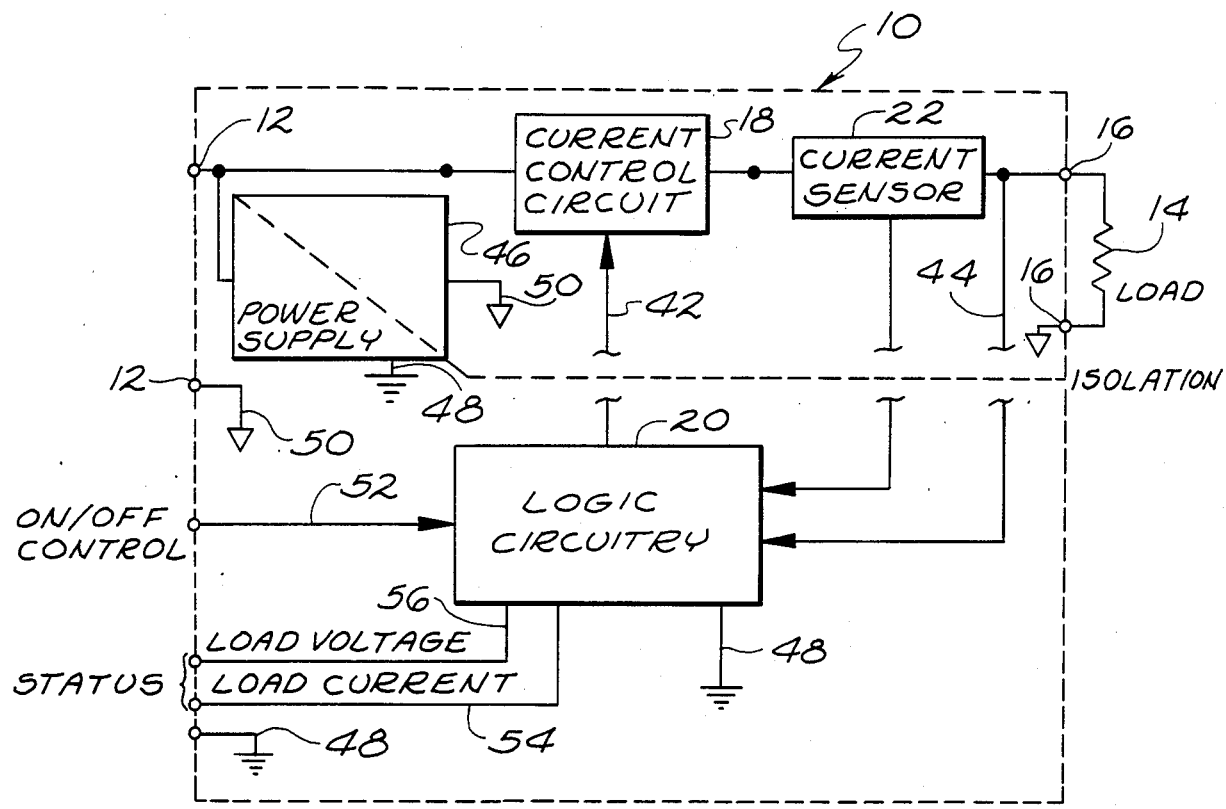
FIG. 1 is a schematic diagram of a power controller constructed in accordance with a preferred embodiment of the present invention, in combination with a generalized load.

Referring now to the drawings, specifically FIG. 1, a power controller 10 constructed according to a preferred embodiment of the present invention interfaces between supply voltage at a pair of input terminals 12 and a load 14 connected across a pair of output terminals 16. Current from the input terminals 12 to the output terminals 16 is controlled by a current control circuit 18 in response to logic circuitry 20, according to a preselected control algorithm and the output of a current sensor 22 connected in line with the load. The logic circuitry 20 switches one portion of the current control circuit 18 between a first condition of low inductance and a second condition of much higher inductance for current limiting, and switches another portion of the current control circuit between conducting and nonconducting states for ON/OFF control. For AC signals the inductive reactance ($X_L$) of the current control circuit 18 is directly proportional to the inductance (L) of the circuit, causing the inductive voltage drop across the current control circuit to be substantially zero in the first condition and large in the second condition. The resistance of the current control circuit 8 is very low to minimize power dissipation and heat generation within the controller.

Figure 2A:
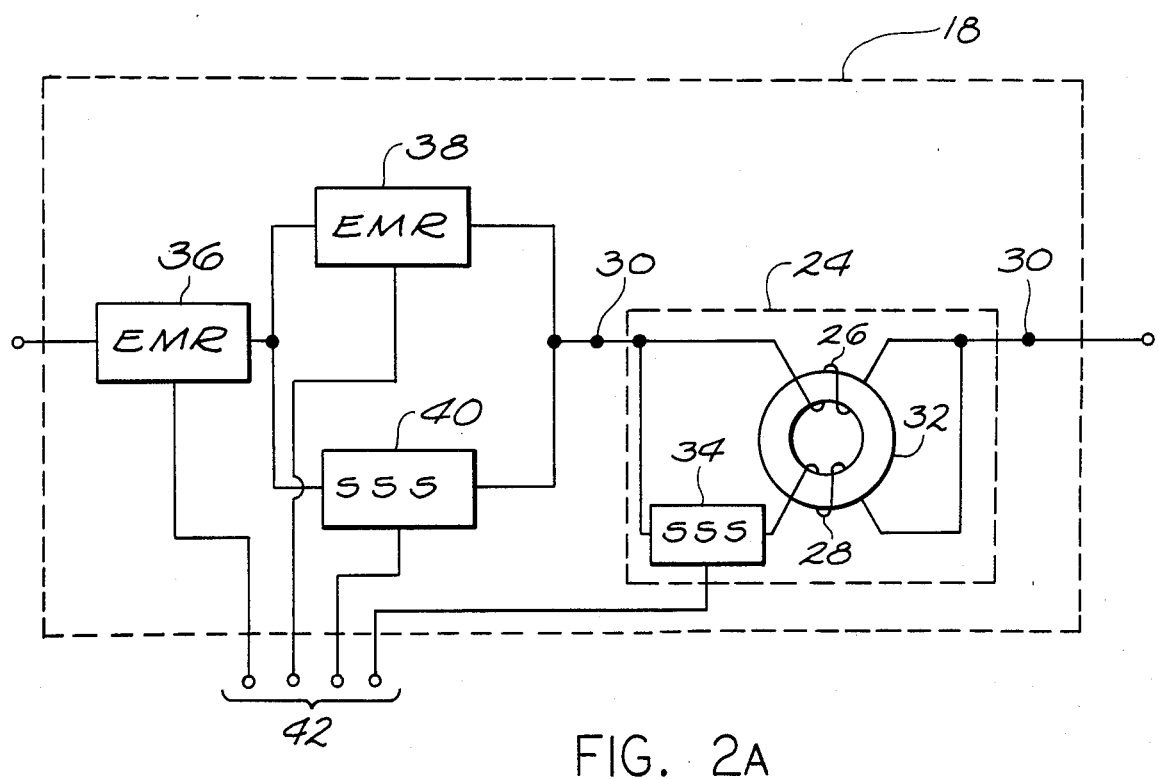
FIG. 2A is a schematic diagram of a current control circuit of the power controller of FIG. 1.

The current control circuit 18 is illustrated in FIG. 2A, wherein a variable inductor has a pair of terminals 30 in series with the load. The variable inductor has a pair of similar conductors 26 and 28 wound together about a core 32 of magnetic material and connected electrically in parallel between pair of terminals 30 so that electrical currents through the conductors are directed oppositely about the core when both conductors are energized. This can be termed an "antiparallel" connection of the conductors relative to the core. It gives rise to magnetizing forces which tend to oppose each other in a "bucking" relationship and causes the magnetic flux through the core 32 to be near zero.

Viewed mathematically, the magnetic flux ($\phi$) through a core is given by the relationship: $\phi=K\mu NI$; where K is a constant, $\mu$ is the permeability of the core material, N is the number of turns about the core, and I is the current through those turns. The total number of ampere-turns (NI) represented by the conductors 26 and 28 is nearly zero when both coils are energized because, except for fringe effects, the fields cancel each other out. The circuit inductance (L) is related to the flux change through the core ($L=N\,d\phi/dt$). Thus, L is nearly zero because $\phi$ is nearly zero.

A switch 34 is connected in series with the conductor 28 to switch the variable inductor 24 from a first condition of low inductance, in which the switch is closed, to a second condition of high inductance, in which the switch is open. Opening of the switch 34 eliminates current through the second winding 28 and permits the magnetic field energy generated by current within the conductor 26 to penetrate the core 32. Although the total number of energized windings is lower in this condition, the effective number of ampere-turns is greater and the inductance is higher because the field developed by the first winding 26 is unopposed.

The logic circuitry 20 (FIG. 1) closes and opens the switch 34 to connect and disconnect the second conductor 28. Because the inductor 24 is in series with the load, virtually the entire applied voltage appears across it when the load is in a fault condition. Thus, the increase in inductance which occurs when the switch 34 is opened limits current to the load. The magnitude of the inductance in that condition is calculated to provide a safe maximum current level.

Referring again to FIG. 2A, in addition to controlling the variable inductance 24, the logic circuitry 20 controls a first electromagnetic relay (EMR) 36 and the parallel combination of a second electromagnetic relay 38 and a solid state switch (SSS) 40, both of which are in series with the variable inductor 24 to provide ON/-OFF control and complete isolation between the power line and the load when in the OFF condition. The solid state switch 40 more fully "opens" the load circuit after current has been limited by the variable inductor 24. The switch 40 acts rapidly and does not have mechanical contacts which might deteriorate if opened or closed under high current and voltage. The first relay 36 is opened after the solid state switch 40 to provide total isolation between the supply voltage and the load when in the OFF state. The second relay 38 is used in the steady state condition to shunt across the closed switch 40. Since the voltage drop across electromechanical contacts is approximately one tenth that across the solid state switch, the power loss and heat generated is reduced by a factor of ten. To avoid deterioration of the contacts of the relay 38, the relay is switched closed or opened only when the solid state switch 40 is conducting. If the small amount of leakage current through the solid state switch 40 is acceptable, the electromagnetic relay 36 can be eliminated. The relays 36 and 38, and the solid state switches 34 and 40 all act in response to signals from the logic circuitry 20 along conductors 42.

Solid state switches must be used where indicated because the response time of EMR's is not fast enough. Also, the current switching at line voltage is synchronized so that the EMR's only switch when the current and/or voltage is low. This greatly prolongs the life of the electromechanical relays.

In the sequence of operation, an "ON" control signal is applied along the line 52 (FIG. 1) to energize the first relay 36 when the inductor 24 is in its high inductance (current limiting) condition. In that condition, the solid state switch 34 is nonconductive. Closure of the first relay 36 is followed in sequence by closure of the solid state switch 40 and the second relay 38 to initiate current flow through the load. The voltage and current to the load are then examined to determine whether a load fault exists. If a fault condition does exist, the load current will be over its rated value and the voltage to the load will be significantly less than the applied voltage. After a prescribed "start-up" perod, such as 200 milliseconds, the second relay 38, the solid state switch 40 and the first relay 36 are opened in sequence. If, however, the load voltage is reasonable (i.e., greater than 40 percent of the applied voltage) after the first relay 36 and the switch 40 are closed, the current limiter is de-energized to its low inductance condition. In the foregoing sequence, it should be noted that the relay 38 switches open or closed in the presence of less than one volt drop across the solid state switch 40, enabling the contacts of the relay to last indefinitely without building up undesired contact resistance.

If a fault develops while the system is in operation, the logic circuitry 20 (FIG. 1) senses it through the current sensor 22 and a voltage sensing lead 44, and activates the variable inductance 24 by opening the switch 34 (FIG. 2A). This takes place in less than 10 microseconds under extreme fault conditions, whereupon the current is limited to no more than a satisfactory short-term value. The second relay 38, the solid state switch 40 and the first relay 36 are then opened sequentially to disconnect the power without harming the relay contacts.

Figure 8A:
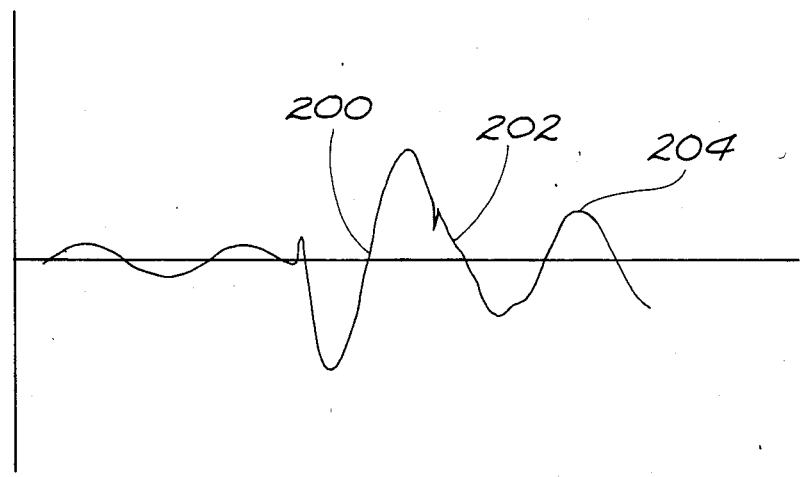
FIG. 8A is a graphical representation of actual data demonstrating the current limiting action of the controller of the present invention in response to an AC overcurrent signal.

FIG. 8A depicts actual data of the current to a load, as it is attenuated in response to an overcurrent condition. The curve 200 represents a sinusoidal current signal which rises above a preselected permissible value (e.g., 350 percent of rated current). The switch 34 of the variable inductor 24 (FIG. 2A) is then opened by the logic circuitry 20 (FIG. 1) at a point 202 to instantaneously limit the current to a maximum of 200 percent of its rated value (curve 204). The current would be reduced to zero (no shown) with the opening of the relay 38, the solid state switch 40 and the relay 36. The irregularity of the curves 200 and 204 is due to noise in the measurement apparatus.

Figure 8B:
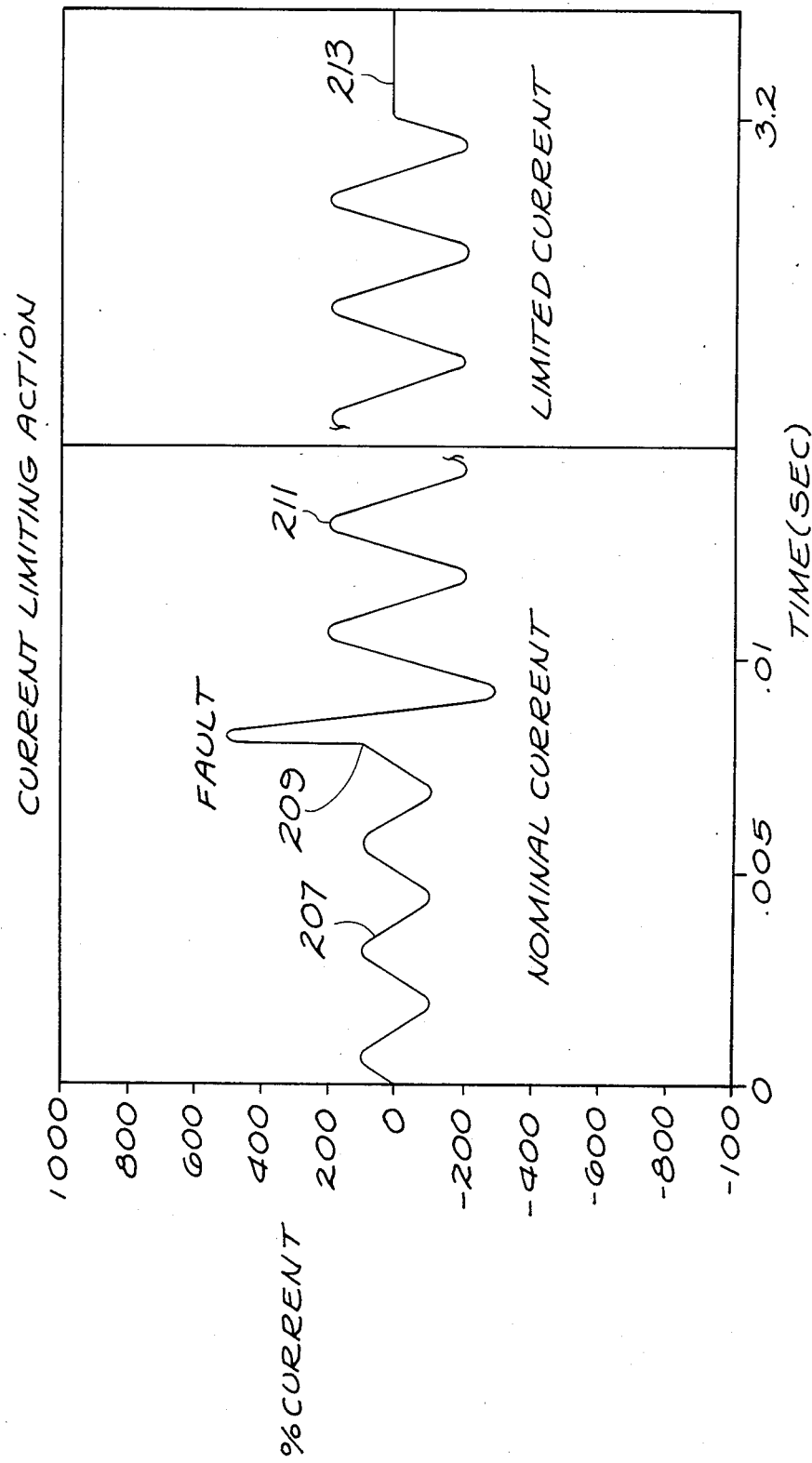
FIG. 8B is a computer derived curve which demonstrates a full current limiting cycle performed by the controller of the present invention.

FIG. 8B is a computer derived curve that simulates turn-on with a normal load resistance (curve 207). A short circuit fault then occurs (point 209), is limited to 200% of rated current (point 211), and finally is cut off (curve 213).

Referring to FIG. 1, the logic circuiry 20 is energized by a power supply 46 within an isolation device that has both a signal ground 48 and a supply ground 50 to separate the signal and the power circuits. Isolation can be provided by optical or transformer means to isolate the signal ground from the power ground. An "ON/OFF" control signal, which may be approximately 5 volts, is externally applied along the line 52 to inform the controller that power is desired at the load 14. In an aircraft, the ON/OFF signal is the output of a pilot-operated switch or a central control computer, and the pilot or computer is provided with current and voltage status signals along lines 54 and 56, respectively. The logic circuitry 20 can be any suitable controller, including a microprocessor control system, but would most often be a special purpose logic circuit capable of performing the control functions described herein.

The current sensor 22 of the power controller 10 may be any commercially available device capable of sensing current within the operating range of the controller. In most instances it will do so by either the resistive technique, the Hall Effect technique or the current transformer technique. The voltage sensing load 44 is connected to a transistor or IC amplifier (not shown) of the logic circuitry 20 for sensing voltage to the load.

Figure 6:
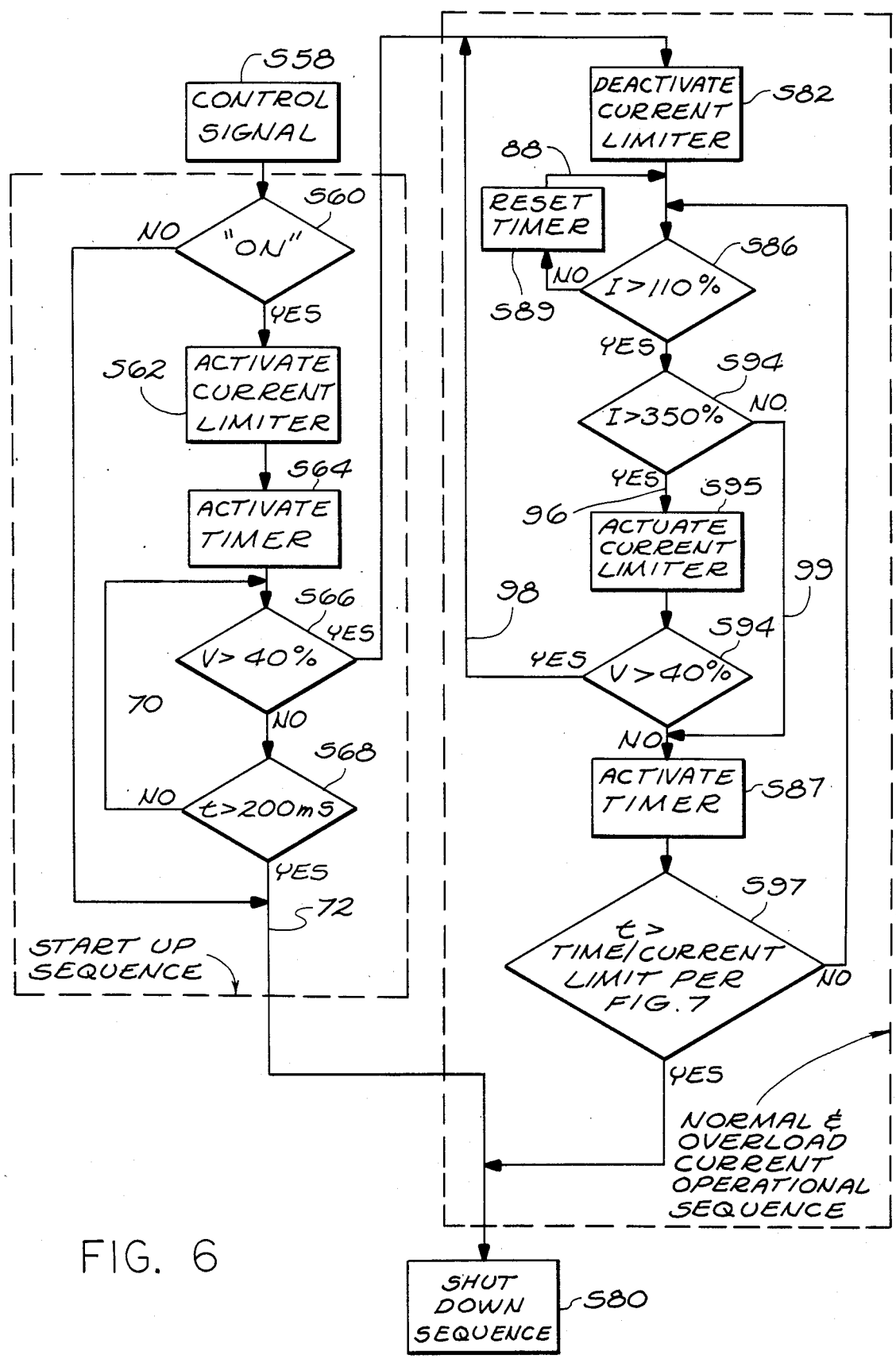
FIG. 6 is a flow chart of a control algorithm performed by the logic circuit of FIG. 1 to implement the method of the present invention.

A preferred control algorithm executed by the logic circuitry 20 is illustrated in FIG. 6, which commences at an entry point 58 corresponding to the receipt of a command signal from a human operator or a master control computer. The signal is evaluated at step S60 to determine whether it is an "ON" command. If it is, the algorighm proceeds to a START-UP SEQUENCE in which the current limiting inductor 24 is activated to its second condition of higher inductance (step S62) so that full power will not be connected to the load in a fault condition. An internal timer is also started (step S64) and the voltage to the load is examined to determine whether it is greater than 40 percent of the applied voltage (step S66). If the voltage is less than 40 percent of the applied voltage, the timer is examined to see whether 200 milliseconds has elapsed (step S68). If 200 milliseconds has not elapsed, the routine returns to step S66 along a path 70 to reexamine the voltage. The routine continues to cycle through the steps S66 and S68 until the voltage exceeds 40 percent or the time (t) exceeds 200 milliseconds. The values "40 percent" and "200 milliseconds" are predetermined values arrived at by considering the start-up characteristics of the loads. Any practical load, whether resistive, capacitive or inductive, will reach 40 percent or more of its rated voltage within a few milliseconds unless it is faulty. Likewise, it is asumed that a motor load will also reach 40 percent of its voltage within 200 milliseconds unless it is faulted. Of course some large, slow-starting motors would require modification of the percentage of rated voltage or the time within which it is to be achieved.

If the voltage to the load does not exceed 40 percent of the applied voltage when the time reaches 200 milliseconds, the routine proceeds along a line 72 to the SHUT DOWN SEQUENCE S80. The shut down sequence S80 is the series of events in which the relay 38, the solid state switch 40 and the relay 36 are opened, in order.

If the voltage to the load exceeds 40 percent of the applied voltage before 200 milliseconds has elapsed (step S66), the load is considered normal, and the current limiting inductor 24 is deactivated (step S82) to apply full voltage to the load. This is accomplished by closing the switch 34 of the inductor 24 (FIG. 2A) so that the magnetic fields produced by current flow through the conductors 26 and 28 cancel and the inductance term essentially drops out.

The load current is continuously monitored (step S86) to determine that it is less than 110 percent of rated current. If it is, the routine circulates within a loop 88 wherein it continuously resets the timer (step S89) until the current exceeds 110 percent of the rated value. Thus, the logic circuit 20 remains within the loop 88 until a fault develops.

If a fault does develop, i.e., if the current exceeds 110 percent, the routine inquires as to whether the current is greater than 350 percent of the rated value (step S94), in which case it proceeds along the line 96 to activate the current limiting inductance (step S95) and evaluate the voltage to the load (step S94). At a high current value, the voltage will be less than 40 percent, causing the system to eventually shut down (step S80). If the load impedance increases so that the voltage exceeds 40 percent of the applied voltage, the logic sequence proceeds along the line 98 to deactivate the current limiter (step S82).

Figure 7:
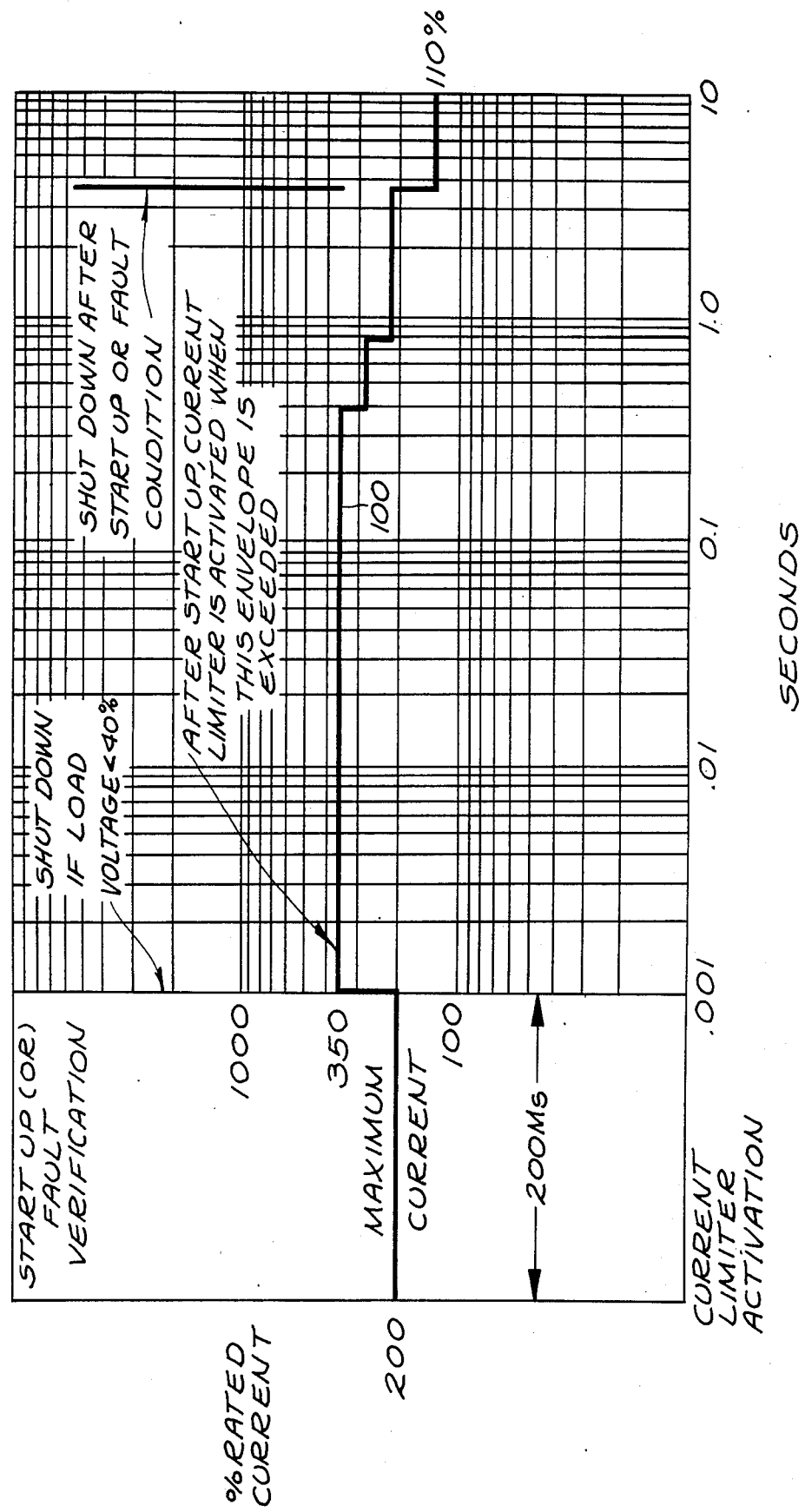
FIG. 7 is a graphical representation of the trip characteristics of the controller of the present invention as a function of time.

If, on the other hand, the current is less than 350 percent at step S94, the routine follows the path 99 to activate the timer (step S87) and evaluate the current to the load (step S97) as a function of the elapsed time (t). The system will shut down if the time and current exceed a preselected time/current relationship, such as that indicated by way of example in FIG. 7. FIG. 7 defines the maximum time that any given overload current will be permitted to exist before the SHUT DOWN SEQUENCE (S80) is initiated, which maximum time depends upon the current level.

According to the trip characteristics of FIG. 7, a high current (up to 200 percent of rated) is permitted for an initial period of up to 200 milliseconds to account for the near short circuit condition encountered during motor startup. After this period, the limits of system operation are represented by a line 100 defining an envelope within which the current control circuit will not be tripped. Thus, the current to the load must remain below 350 percent of rated current or the current limiter will be activated. Regardless of whether the current limiter is activated, the device will shut down after a prescribed period if the load current is greater than 110 percent of the rated value. That period depends upon the level of load current. For example, shut down will occur in 0.4 seconds for a current greater than 300 percent and in 3.7 seconds for a current between 110 percent and 210 percent. The time periods embodied in steps 68 and 97 of the algorithm of FIG. 6 correspond to the initial start-up period and the maximum overcurrent period, respectively, to which the associated circuit can be subjected without damage. The timer-current levels of FIG. 7 can, of course, be adjusted to produce any desired overcurrent limits.

Figure 3A:
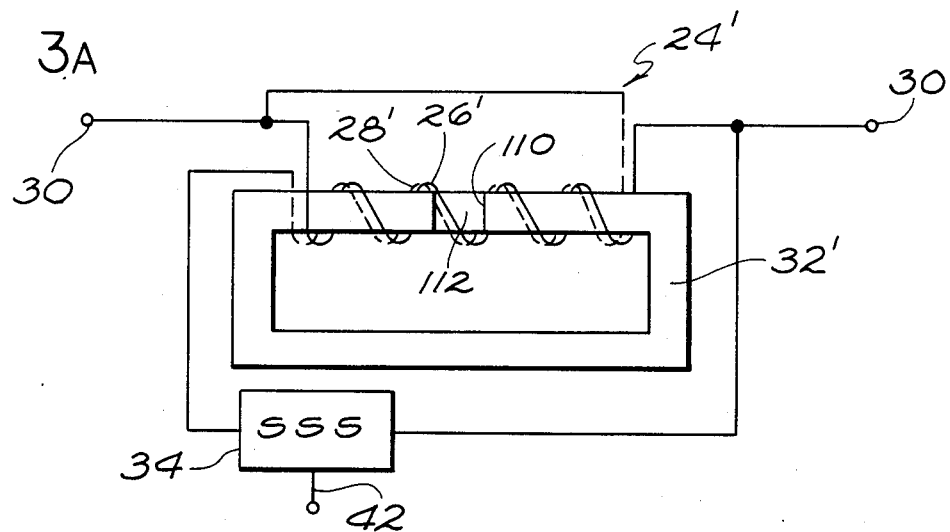
FIG. 3A is a generalized schematic diagram of one form of controllable inductor constructed according to a preferred embodiment of the present invention and useful in the circuits of FIGS. 2A and 2B.

FIG. 3A illustrates an alternative embodiment 24' of the variable inductor of the present invention, wherein conductors 26' and 28' are preferably identical strands of insulated wire wound side-by-side around a core 32' in the region of a gap 110 which contains a suitable dielectic material 112. The conductors 26' and 28' are connected in antiparallel, as that term is defined above, giving rise to magnetizing forces which oppose each other in a "bucking" relationship when the solid state switch 34 is closed to place the device in the low impedance state. The conductor 28' is disconnected when the solid state switch is open, placing the device in the high impedance state. The closer the conductors 26' and 28' are to one another, the more completely their magnetic fields cancel in the condition of low impedance. A simple way to accomplish this is to form the conductors 26 and 28 as a single length of bifilar wire. In that case, local cancellation will be almost complete, exceeded only by the case in which the conductors are coaxial with one another.

Figure 3B:
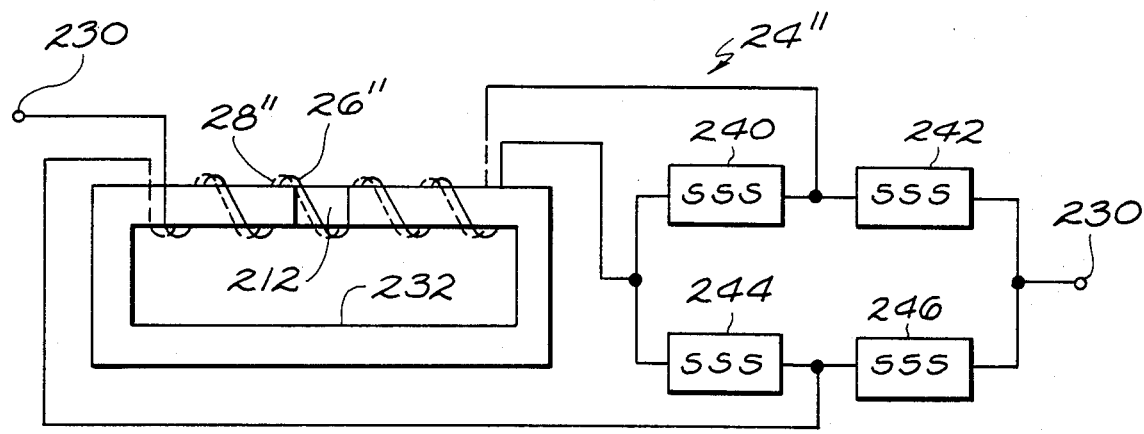
FIG. 3B is a generalized schematic diagram of another form of the controllable inductor of the present invention.

Another preferred embodiment 24" of the variable inductor is illustrated in FIG. 3B, in which a pair of bifilar conductors 26" and 28" are wound about a core 232 in the region of a gap which contains a dielectric 212. The conductors are connectable together in series through a network of solid state switches 240, 242, 244 and 246, so that the electric fields produced by current thereon either "buck" or reinforce each other. The direction of current flow in the second coil can be reversed relative to the direction of flow in the first coil by properly controlling the ON/OFF status of solid state switches 240, 242, 244 and 246. A first "bucking" condition of current flow is set up when the switches 240 and 246 are conducting and the switches 242 and 244 are nonconducting. This corresponds to the low impedance condition of the inductor 24". Reversing the conductive states of the switches reverses the direction of current flow in the coil 28", placing the inductor in the high impedance state. The fields produced by the currents then reinforce each other. While the embodiment 24" requires more solid state switches than that of FIG. 2A, it has the advantage of using both coils in the condition of high inductance. This increases the attainable inductance in a device of essentially the same size and weight.

Figure 3C:
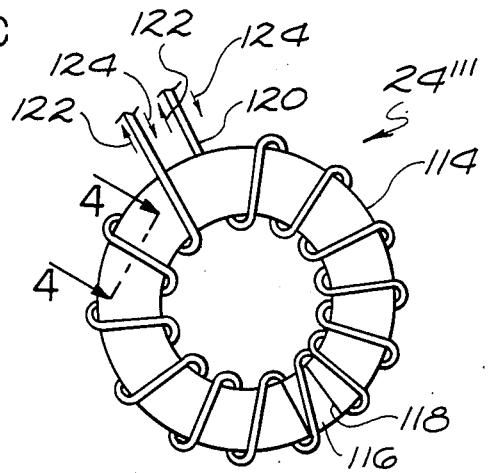
FIG. 3C is a schematic representation of yet another form of the controllable inductor of the present invention.
Figure 4A:
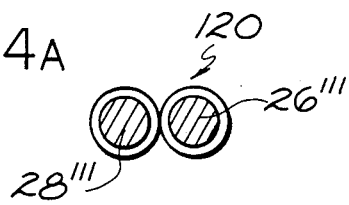
FIG. 4A is a fragmentary cross sectional view taken along the line 4—4 of FIG. 3C, showing a bifilar conductor of the controllable inductor of FIG. 3B.
Figure 4B:
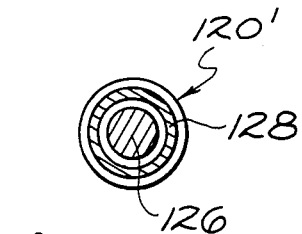
FIG. 4B is a fragmentary cross-sectional view similar to FIG. 4A, but illustrating a coaxial conductor used in a variational form of the invention.

FIG. 3C is a schematic representation of a variable inductor 24''' constructed according to yet another preferred embodiment of the present invention, in which the terminals 30, the switch 34 and the connecting wires have been omitted for clarity. The inductor 24''' comprises an annular magnetic core 114 having a dielectric 116 within a fixed gap 118 thereof, and a dual conductor 120 coiled about the core. The dual nature of the conductor 120 is illustrated by oppositely directed arrows 122 and 124, which correspond to oppositely directed currents in the first condition of low impedance. The conductor 120 can take the form illustrated in FIG. 4A, in which it is a bifilar conductor having separately insulated strands 26''' and 28''' extending side-by-side, or may be a coaxial conductor 120', as illustrated in FIG. 4B. The conductor 120' has a central conductive portion 126 which is surrounded by and insulted from an outer conductive portion 128 to confine the electric field produced in the first condition of low impedance to the space therebetween. In this case, the fields cancel each other precisely, reducing the impedance of the circuit to substantially zero.

Figure 5:
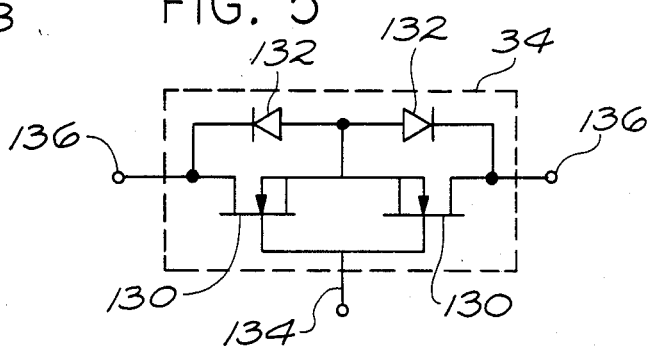
FIG. 5 is a schematic diagram of a bipolar power switch useful in the controller of FIG. 1.

A preferred form of the solid state switch 34 (FIGS. 2A and 3A) and the solid state switches 240-246 (FIG. 3B) is illustrated in FIG. 5. The switches are made up of a pair of power FET's 130 connected in series and shunted by respective oppositely directed diodes 132. Diodes 132 are "body" diodes built into the FET's and are not discrete diodes added to the circuit. The FET's are controlled by a common gate lead 134 to open or close the circuit between a pair of terminals 136. Because power FET's can switch at any point in a cycle of alternating current, they provide virtually instantaneous action when compared to back-to-back SCR's, which can only switch off at a zero current crossing. This capability is illustrated in FIG. 8, wherein current to the load was limited almost instantaneously upon receiving the switching command. The series combination of FIG. 5 is required because FET's are unidirectional devices.

Figure 2B:
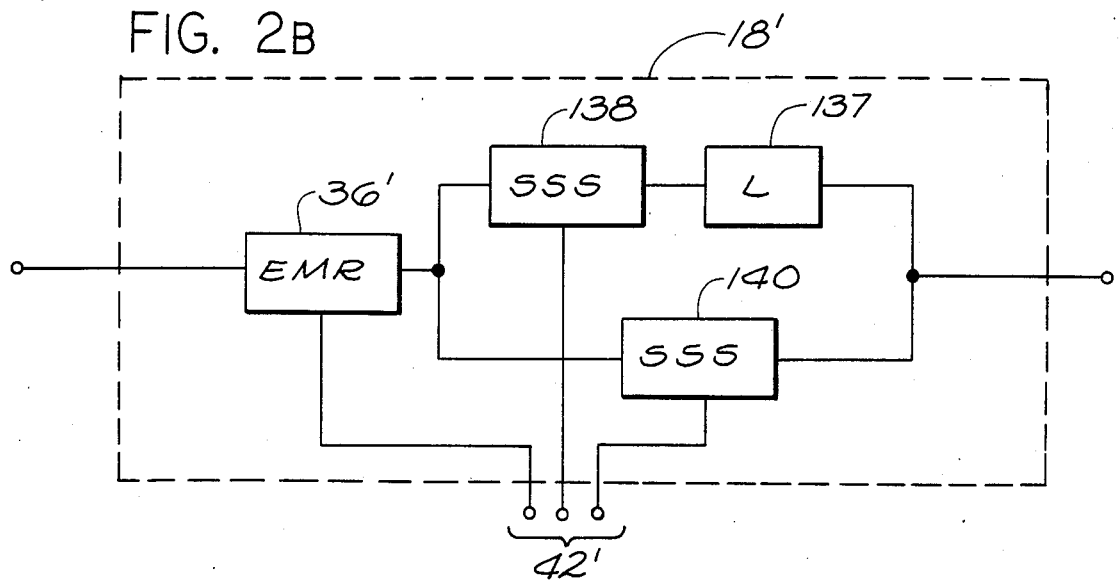
FIG. 2B is a schematic diagram of another embodiment of the current control circuit of FIG. 1.

FIG. 2B illustrates an alternative embodiment 18' of the current control circuit of FIG. 1, in which an inductance 137 may be either a fixed value inductor switched in and out of the load circuit, as required to control the current to the load, or a variable inductor of the type identified as 24, 24', 24'' or 24''' in FIGS. 2A, 3A, 3B and 3C, respectively. Although the inductor 137 is treated hereafter as a fixed value inductor, it could just a well be a variable inductor.

Referring to FIG. 2B in greater detail, a series combination of the inductor 137 and a solid state switch 138 is connected in parallel with a second solid state switch 140, and the combination of these elements is in series with an electromagnetic relay 36'. The solid state switches 138 and 140 switch the inductor 137 into and out of the load circuit, and the relay 36' disconnects all power to the load. The solid state switches and the relay are controlled by the logic circuitry 20 of FIG. 1 in accordance with the algorithm of FIG. 6. On receipt of an "ON" command, the relay 36' is closed and the solid state switches 138 and 140 are left open. At that time, the relay experiences only the leakage current of the switches. The solid state switch 138 is then closed to connect the inductor 137 into the load circuit and limit the current if the load happens to be shorted. If the voltage and current to the load are found to be normal in this condition, the solid state switch 140 is cloed to shunt across the inductor 137 and provide full power to the load. The solid state switch 138 may then be opened, but that is not required because the inductor is in parallel with the much lower resistance of the closed switch 140. Thus, the inductance of the current control circuit 18' is controllable between a first condition of substantially zero inductance and a second condition of inductance L. This can be accomplished in as short a time as ten (10) microseconds, which is the time required to switch the bidirectional FET switch 34 of FIG. 5. As with the circuit 18 of FIG. 2A, the switching elements of the circuit 18' are controlled by logic circuitry 20 through conductors 42'. The solid state switches 138 and 140 are preferably similar in construction to the switch 34 of FIG. 5.

Although it is desirable to have the solid state switch 138 in the current control circuit 18' so that the relay 36' does not have to break appreciable currents, the switch can be omitted, if desired. The relay then opens in the presence of whatever current happens to be passing through the inductor 137 at the time.

The operation of the current control circuit of the present invention can be best understood in the context of an example. Consider a circuit rated at 10 amps and designed to operate at 120 volts and a frequency of 400 hertz in an aircraft having two parallel-connected generators with capacities of 3000 amps each at short circuit. The impedance of the load is then approximately 12 ohms at rated current. Without the controller 10, a shorted load could draw between 3,000 and 6,000 amps through the wiring of the system, devastating both the load and the wiring. In such a case, the current control circuit of the present invention could provide an inductive reactance ($X_L$) of approximately 6 ohms in the condition of high inductance, limiting the current to less than 20 amps. Assuming a residual impedance of approximately 0.01 ohms in the condition of low inductance, the inductive reactance would be 600 times greater in the second condition than in the first.

A more concrete example of the variable inductor 24 can be provided in the context of design criteria discussed in Catalog #SC-142A of the Arnold Engineering Company, the disclosure of which is hereby incorporated by reference. An AL-18 core of the type described in the catalog, having a gap of 1.067 centimeters, a magnetic path of 14.34 centimeters, a window area of 6.389 square centimeters, an effective iron area of 1.257 square centimeters, and a core weight of 0.3 pounds, was used to fabricate a prototype device. The core was wound with 320 turns of No. 18 bifilar copper wire having a total weight of 0.575 pounds, yielding a device with a total weight of 0.875 pounds. The resistance was found to be 0.743 ohms and the inductance was measured as 4.54 millihenrys. Assuming a nominal inductance of 0.1 millihenrys when current is passed oppositely through the two filaments of the coil, the inductance in the second condition would be approximately 45 times higher than the inductance in the first condition of balanced current.

Another factor relevant to the utility of the present method of current control is the fact that inductive reactance is proportional to the frequency of the applied voltage. Thus, the inductive reactance of elements 24, 24', 24'', 24''' and 137 would increase considerably at frequencies above 400 hertz, making the parameters of current control even more attractive. This consideration is particularly significant in that frequencies as high as 20 kilohertz have been proposed to supply power in aerospace applications. Such frequencies would increase the inductive reactances available to limit current by up to 50 times.

The following table illustrates the power of the inductive current limiting device used in the circuits of FIGS. 2A and 2B, as compared with a third circuit where the solid state switch (power FET) itself limits the current. System parameters are assumed to be as follows:

TABLE I

Supply Voltage ($E_S$) = 120 V, 1000 Hz
Rated Current ($I_R$) = 10 A
Limited Fault Current ($I_{CL}$) = 20 A
Voltage Drop = 1.0 V across FET's when saturated
Inductive Impedance = 0 + j6 = 0 + jωL
∴ L = 0.95 mH (Pure)
Ambient Temperature = 70 degrees Celsius
Steady State Junction Temperature = 100 degrees Celsius maximum
Maximum Junction Temperature = 150 degrees Celsius
Saturation Resistance of the power FET ($R_S$) =

| Circuit | SSS | Rs | Maximum Voltage (Open Current) | Power Loss Steady State | Power Loss Current Limit | Energy Loss (2 Seconds) | Notes |
|---|---|---|---|---|---|---|---|
| FIG. 2A. | 34 | 0.2Ω | 240 V | 5 W | 0 | 0 | 1, 2 |
| FIG. 2A. | 40 | 0.2Ω | 120 V | 5 W | 80 W | 160 W-sec. | 1, 2 |
| FIG. 2B. | 138 | 0.1Ω | 120 V | ~0 W | 40 W | 80 W-sec. | 3 |
| FIG. 2B. | 140 | 0.1Ω | 120 V | ~10 W | ~0 W | 0 | 3 |
| SSS only | SSS | 0.1Ω | 120 V | 10 W | 2400 W | 4800 W-sec. | 4 |

Notes
1 Assumes that one half of current passes through each leg of inductor.
2 Heat sink and FET's must handle 5 watts each, steady state, with an allowable temperature rise of 30 degrees Celsius, and SSS 40 must handle 160 watt-seconds of energy with an allowable junction rise of 50 degrees Celsius in two seconds.
3 Similar comments as (2) except power loss during current limiting is reduced by 50%.
4 The heat sink problems are so great as to make this approach impractical.

From the above, it can be seen that there has been provided an improved apparatus and method for virtually instantaneous reduction of overcurrent to a load, without significant heat dissipation under either steady state or overcurrent conditions.

The appended claims are not limited to the embodiment described herein, but rather are intended to cover all variations and adaptations falling within the true scope and spirit of the present invention. For example, the forms of inductors described herein and the various switching elements used to implement the current control circuits 18 and 18' are disclosed by way of example only. A variety of other structures would be used for these purposes, subject to the disclosed requirements that they act rapidly and not dissipate an undue amount of energy.

What is claimed is:

1. Apparatus for controlling power to a load, comprising:
   inductive circuit means controllable between a first condition of low inductance and a second condition of higher inductance, the inductive circuit means comprising:
   first coil means; and
   second coil means electrically connectable to the first coil means for energization therewith to produce magnetizing forces when the inductive circuit means is in either of said first and second conditions;
   the first and second coil means being constructed and arranged so that the magnetizing force produced by current flow in the second coil means opposes the magnetizing force produced by current flow in the first coil means in said first condition of low inductance and reinforces the magnetizing force produced by current flow in the first coil means in said second condition of higher inductance, with the first and second coil means connected electrically in series when the inductive circuit means is in said second condition of higher inductance;
   means for applying a voltage to a load through said inductive circuit means;
   means for sensing current to the load; and
   means for switching the inductive circuit means from the first condition of low inductance to the second condition of higher inductance in response to sensing of a preselected overcurrent condition.

2. The apparatus of claim 1 wherein:
   the means for switching the inductive circuit means from the first condition to the second condition comprises a solid state switch.

3. The apparatus of claim 1 wherein:
   the inductive circuit means further comprises magnetic core means; and
   the first and second coil means are wound about the core means so that current flow therein gives rise to substantially zero magnetic flux in the core means when the inductive circuit means is in said first condition of low inductance.

4. The apparatus of claim 1 wherein:
   the inductance of the inductive circuit means is at least ten times higher in said second condition than in said first condition.

5. The apparatus of claim 1 wherein:
   the second coil means is closely associated with the first coil means so that said magnetizing forces interact substantially at the location of said first coil means.

6. The apparatus of claim 5 wherein:
   the second coil means has substantially the same conductivity and number of turns as the first coil means.

7. The apparatus of claim 6 wherein:
   the first and second coil means comprise bifilar conductive means having first and second conductive filaments running substantially side-by-side, the first coil means comprising the first conductive filament and the second coil means comprising the second conductive filament.

8. The apparatus of claim 5 wherein:

the first and second coil means comprise coaxial conductive means having a central conductive portion and an outer conductive portion, the first coil means comprising one of said conductive portions and the second coil means comprising the other of said conductive portions.

9. The apparatus of claim 1 which further comprises:
means for sensing the voltage applied to the load; and
the switching means is responsive to both the current sensing means and the voltage sensing means.

10. The apparatus of claim 1 wherein:
the inductive circuit means extends between first and second terminals;
the first and second coil means are wound together about a magnetic core from respective first ends to respective second ends;
the first end of the first coil means is connected to said first terminal;
the second end of the first coil means is connectable alternately to the first and second ends of the second coil means by controllable switching means; and
said second terminal is connectable alternately to the first and second ends of the second coil means by other controllable switching means;
whereby current in the two coil means can be caused to flow in opposite directions in the first condition of low impedance and in the same direction in the second condition of higher impedance by operation of the controllable switching means.

11. Apparatus for controlling power to a load, comprising:
inductive circuit means controllable between a first condition of low inductance and a second condition of higher inductance, the inductive circuit means comprising:
first coil means; and
second coil means electrically connectable to the first coil means for energization therewith to produce magnetizing forces when the inductive circuit means is in either of said first and second conditions;
the first and second coil means being constructed and arranged so that the magnetizing force produced by current flow in the second coil means opposes the magnetizing force produced by current flow in the first coil means in said first condition of low inductance and reinforces the magnetizing force produced by current flow in the first coil means in said second condition of higher inductance, with the first and second coil means connected electrically in series when the inductive circuit means is in said second condition of higher inductance;
means for applying a voltage to a load through said inductive circuit means;
means for sensing current to the load; and
means for switching the inductive circuit means from the first condition of low inductance to the second condition of higher inductance in response to sensing of a preselected overcurrent condition; and
at least one switch means in series with the inductive circuit means for effectively disconnecting power to the load when the inductive circuit means is in said second condition of higher inductance.

12. The apparatus of claim 11 wherein:
the means for switching the inductive circuit means from said first condition to said second condition comprises a solid state switch.

13. The apparatus of claim 11 wherein:
said at least one switch means comprises first and second series-connected switch means, the first switch means comprising a first electromagnetic relay and the second switch means comprising a second electromagnetic relay in parallel with a solid state switch.

14. The apparatus of claim 11 which still further comprises:
at least one other switch means in parallel with the inductive circuit means.

15. The apparatus of claim 14 wherein:
said at least one other switch means comprises solid state switch.

16. A method for controlling power to a load, comprising the steps of:
applying a voltage to a load through inductive circuit means which has first and second coils controllable between a first condition of low inductance and a second condition of higher inductance;
said voltage being applied by energizing said coils so that the magnetizing force produced by current flow in the second coil opposes the magnetizing force produced by current flow in the first coil in said first condition of low inductance and reinforces the magnetizing force produced by current flow in the first coil in said second condition of higher inductance, the first and second coil means being connected electrically in series when the inductive circuit means is in said second condition of higher inductance;
sensing current to the load; and
switching the inductive circuit means from said first condition to said second condition in response to sensing of a preselected overcurrent condition.

17. The method of claim 16 wherein:
the inductive circuit means has a magnetic core; and
the first coils are energized so that they give rise to substantially zero net magnetic flux in the core when the inductive circuit means is in said first condition of low impedance.

18. The method of claim 16 which further comprises:
sensing the voltage applied to the load; and
the inductive circuit means is switched in response to both the current and the voltage to the load.

19. The method of claim 16 wherein:
power to the load is effectively disconnected after the inductive circuit means has been switched to the second condition of higher inductance by opening a solid state switch and then opening an electromagnetic relay, both connected in series with the load.

20. The method of claim 16 which further comprises:
initially applying a voltage to the load when the inductive circuit means is in said second condition of higher inductance;
sensing the current and voltage to the load to determine whether a fault condition exists; and
switching the inductive circuit means to said first condition of low inductance if a fault condition does not exist.

21. The method of claim 20 which still further comprises:

minimizing operating impedance in the absence of a fault condition by shunting the inductive circuit means after it is switched to said first condition.

22. An inductive circuit controllable between a first condition of low impedance and a second condition of higher impedance to control power to a load, comprising:

first coil means;

second coil means electrically connectable to the first coil means for energization therewith to produce magnetizing forces when the inductive circuit means is in either of said first and second conditions;

the first and second coil means being constructed and arranged so that the magnetizing force produced by current flow in the second coil means opposes the magnetizing force produced by current flow in the first coil means in said first condition of inductance and reinforces the magnetizing force produced by current flow in the first coil means in the second condition of higher inductance, with the first and second coil means connected electrically in series when the inductive circuit means is in said second condition of higher inductance.

23. The inductuve circuit of claim 22 wherein:

the second coil means is closely associated with the first coil means so that said magnetizing forces interact substantially at the location of said first coil means.

24. The inductive circuit of claim 23 wherein:

the first and second coil means comprise bifilar conductive means having first and second conductive filaments running substantially side-by-side, the first coil means comprising the first conductive filament and the second coil means comprising the second conductive filament.

25. The inductive circuit of claim 22 wherein:

the inductive circuit means extends between first and second terminals;

the first and second coil means are wound together about a magnetic core from respective first ends to respective second ends;

the first end of the first coil means is connected to said first terminal;

the second end of the first coil means is connectable alternately to the first and second ends of the second coil means by controllable switching means; and said second terminal is connectable alternately to the first and second ends of the second coil means by other controllable switching means;

whereby current in the two coil means can be caused to flow in opposite directions in the first condition of low impedance and in the same direction in the second condition of higher impedance by operation of the controllable switching means.

* * * * *

UNITED STATES PATENT AND TRADEMARK OFFICE
CERTIFICATE OF CORRECTION

PATENT NO. : 4,695,917            Page 1 of 2

DATED : September 22, 1987

INVENTOR(S) : Kenneth R. Jackson, Farshid Tofigh

It is certified that error appears in the above-identified patent and that said Letters Patent is hereby corrected as shown below:

IN THE SPECIFICATION:

Column 2, line 1, after "relays of", delete --a--;

Column 4, line 28, "8" should read --18--;

Column 5, line 13, after "ON/", delete -- - --;

Column 5, line 55, change "perod" to --period--;

Column 6, line 19, after "zero", change "(no shown)" to --(not shown)--;

Column 6, line 28, change "circuiry" to --circuitry--;

Column 6, line 50, change "load" to --lead--;

Column 6, line 59, change "algorighm" to --algorithm--;

Column 7, line 11, change "asumed" to --assumed--;

Column 8, line 22, change "dielectic" to --dielectric--;

Column 9, line 42, before "well", change "a" to --as--;

Column 9, line 60, change "cloed" to --closed--;

Column 10, line 29, change "0.01" to --.01--.

UNITED STATES PATENT AND TRADEMARK OFFICE
CERTIFICATE OF CORRECTION

PATENT NO.   :   4,695,917             Page 2 of 2
DATED        :   September 22, 1987
INVENTOR(S)  :   Kenneth R. Jackson, Farshid Tofigh It is certified that error appears in the above-identified patent and that said Letters Patent is hereby corrected as shown below:

IN THE CLAIMS:

Column 14, line 16, after "comprises", insert --a--.

Column 15, line 27, change "inductuve" to --inductive--.

Signed and Sealed this

Twenty-second Day of March, 1988

*Attest:*

DONALD J. QUIGG

*Attesting Officer*     *Commissioner of Patents and Trademarks*